United States Patent [19]
Hardtke

[11] Patent Number: 5,104,079
[45] Date of Patent: Apr. 14, 1992

[54] SUPPORTING CLAMP FOR MOUNTING CONSTRUCTIONAL COMPONENTS, FOR EXAMPLE TUBES OR THE LIKE

[75] Inventor: Hans H. Hardtke, Zeven, Fed. Rep. of Germany

[73] Assignee: Lisega GmbH, Fed. Rep. of Germany

[21] Appl. No.: 602,523

[22] Filed: Oct. 24, 1990

[30] Foreign Application Priority Data

Oct. 24, 1989 [DE] Fed. Rep. of Germany ....... 3935504

[51] Int. Cl.⁵ .................................................. A47B 96/06
[52] U.S. Cl. ........................................ 248/228; 52/39; 52/584; 403/387
[58] Field of Search .................. 248/228, 72, 74.1; 52/39, 665, 584; 403/387, 389

[56] References Cited

U.S. PATENT DOCUMENTS

| | | | |
|---|---|---|---|
| 673,144 | 4/1901 | Streeter | 403/387 |
| 1,281,531 | 10/1918 | Dietrich | 248/228 |
| 1,473,504 | 11/1923 | Neely | 248/228 |
| 1,974,628 | 9/1934 | Presley | 248/228 |
| 2,933,567 | 4/1960 | Mageoch | 248/228 |
| 4,135,692 | 1/1979 | Ferguson | 248/228 X |
| 4,422,609 | 12/1983 | Clark | 248/228 |
| 4,930,732 | 6/1990 | Hardtke | 248/74.1 X |

Primary Examiner—Carl D. Friedman
Assistant Examiner—Korie H. Chan
Attorney, Agent, or Firm—Diller, Ramik & Wight

[57] ABSTRACT

In a supporting clamp for mounting constructional components, in particular pipe conduits, a fixing means is formed by a bar extending transversal to the beam and being arranged at the lower surface of the beam flange. On both sides of the beam flanges (2a) of the beam (2) longitudinally extending supporting sheet members (3,4) are arranged suspended on rounded bearing bars (5,6). The supporting sheet members (3,4) have longitudinal slots (9, 10). A web plate (8) is arranged in these slots which is secured against vertical displacement.

15 Claims, 2 Drawing Sheets

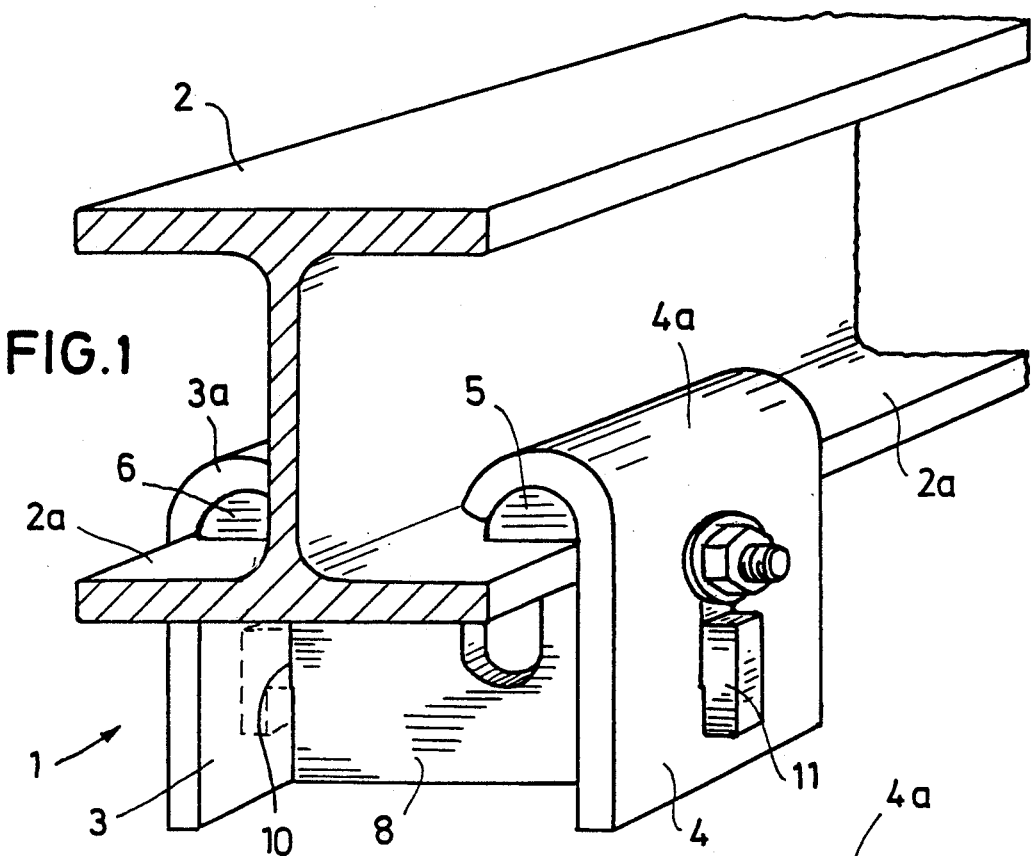
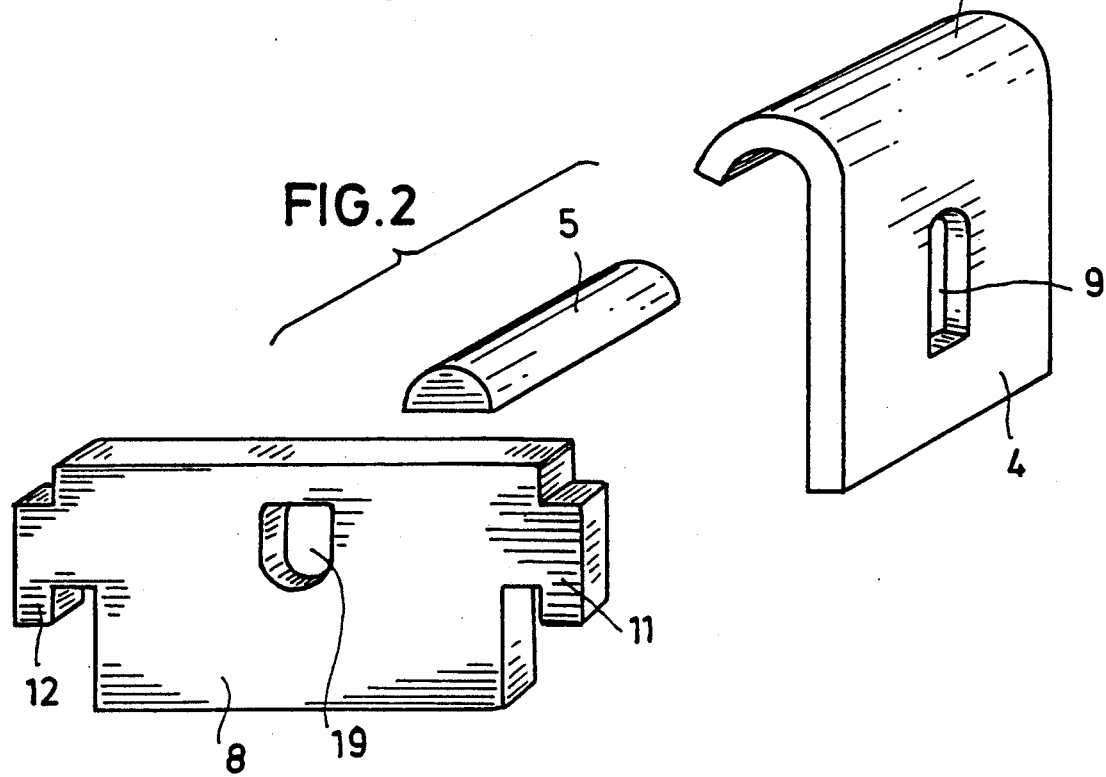

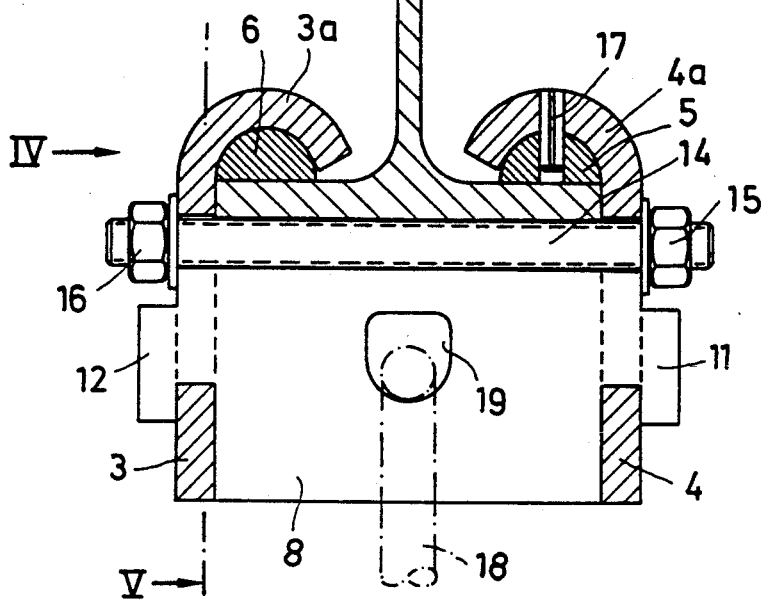
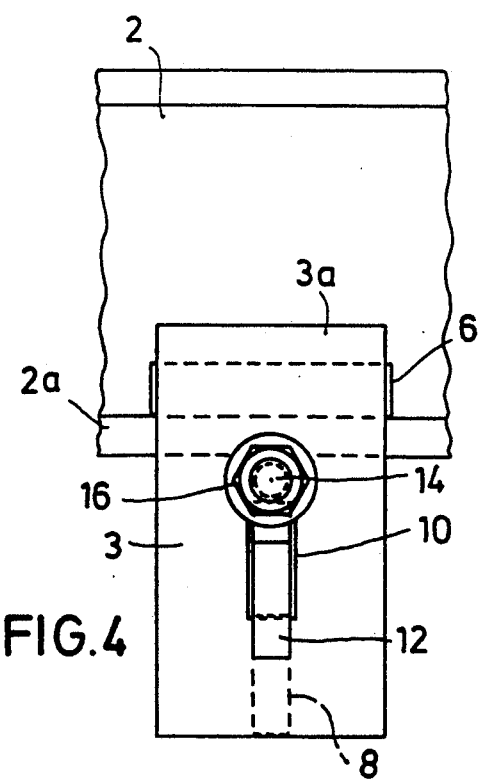
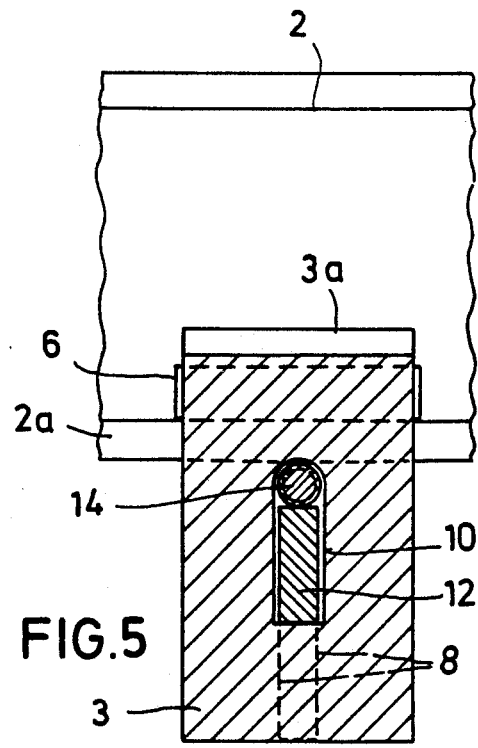

SUPPORTING CLAMP FOR MOUNTING CONSTRUCTIONAL COMPONENTS, FOR EXAMPLE TUBES OR THE LIKE

BACKGROUND OF THE INVENTION

The invention relates to a supporting clamp for mounting constructional components, for example tubes or the like, in particular for pipe conduits of power plants or industrial plants, e.g. of the chemical industry or the like, a fixing means being provided at the lower flange of a flanged beam, e.g. a standard beam, for connecting a mounting for the pipes or the like to a structure.

With supporting clamps of the above mentioned type it is known to provide the fixing means with a bar extending transversal to the beam, which is provided at the lower surface of the beam flange and fastened to the beam by screws. The mounting for the pipe conduit or the like engages at the bar. The bar provided at the lower surface of the flange of the beam provides a certain reinforcement of the flange portion of the beam. This reinforcement depends on the cross section of the screw bolt and is comparatively limited.

SUMMARY OF THE INVENTION

It is an object of the invention to provide a supporting clamp of the type mentioned initially, which is highly stressable and is composed of simple components. It is an advantage of the present invention that in a supporting clamp of the above mentioned kind, supporting sheet members extending longitudinally along the beam are arranged on both sides of the beam flanges, hanging on rounded bearing bars. It is a further advantage of the present invention that the supporting sheet members have longitudinal openings therein, into which a web plate is hung, and that the web plate is secured against vertical displacement.

Such a design of the supporting clamp results in a simple and secure construction of the supporting clamp. Only plate members cooperate that are easily assembled. The use of these plate members allows the transmission of substantially greater forces than is possible with screw bolts. Moreover, an optimal tension-free abutment of the supporting sheet members is obtained by their resting on rounded bars. The web plate itself may differ in height depending on the loads to be received by the web plate and thus by the beam. No welding is required. The plates may be produced at low cost and are easy to be assembled. A part of the plates may be used for any optional size of a beam so that plates can be kept in store.

Preferably, the rounded bearing for the supporting sheet member is of semi-circular cross section so that a perfect engagement between the bearing and the supporting sheet member is obtained.

According to a further feature of the invention, the web plate is a plate member having undercut projections formed at its lateral surfaces. These projections engage the supporting sheet members through the slits in the same. The thickness of the web plates is adapted to the width of the slits.

The supporting sheet member is suitably secured against vertical displacement by a rod extending transversal to the flanged beam. Preferably, use is made of a tie rod, e.g. a threaded rod, a screw bolt or the like. In this case, the securing rod is arranged above the slits in the plane of the web plate. In this way it is ensured that the web plate hung into the support sheet members will not be detached from the same.

The tie rod, e.g. the screw bolt, is passed through the supporting sheet members. On the outside, a nut may be screwed onto the threaded end of the tie rod.

Preferably, the bent part of the supporting sheet members and the rounded bearing bar are held together by tension. This may be achieved, e.g., by a pin, a tensioning sleeve or the like engaging into a bore or the like.

The web plate is provided with a hole, an aperture or the like for passing a lug or a bracket therethrough for a mounting rod assembly for the members, e.g. a pipe conduit or the like, to be hung from the supporting clamp.

The following is a detailed description of an embodiment of the present invention with reference to the drawings.

BRIEF DESCRIPTION OF THE DRAWINGS

FIG. 1 is a perspective view of an embodiment of the supporting clamp of the present invention, FIG. 2 illustrates each of the individual parts of the supporting clamp, FIG. 3 is a vertical section of a beam and a supporting clamp, FIG. 4 is a view of the supporting clamp of FIG. 3, seen in the direction of the arrow IV, and FIG. 5 is a section following the line V—V in FIG. 3.

DESCRIPTION OF THE PREFERRED EMBODIMENTS

The supporting clamp 1 serves to suspend constructional components, for example pipe conduits, from a beam 2, e.g. a standard beam of a solid structure. On both sides of the flanges 2a of the beam there are supporting sheet members 3, 4 arranged in the longitudinal direction of the beam 2, which have a semi-circular bend 3a, 4a in the upper part thereof, with which bend they rest upon bearing bars 5,6 suitably having a semi-circular cross section. This results in an optimum bearing of the supporting sheet members on the flanges of the beam 2a.

A web plate 8 is provided between the supporting sheet members 3, 4, extending transversal to the longitudinal extension of the beam 2. Suitably, the connection between the web plate 8 and the supporting sheet members 3, 4 is a plug connection. To this end, the supporting sheet members 3,4 are provided with longitudinal holes 9, 10. The web plate 8, usually a plate member, has its lateral end faces provided with undercut projections 11, 12. Inserting the web plate 8 into the holes 9 and 10 of the supporting sheet members 3, 4 by means of the projections 11 and 12 causes the projections to engage behind the supporting sheet members so that a mutual locking of the supporting sheet members and the web plate is achieved and the plate-shaped members are firmly connected with each other.

The web plate 8 is secured against vertical displacement with respect to the supporting sheet members 3, 4 by providing a bar or the like above the web plate, which locks the free space between the projections 11,12 of the web plate 8 and the upper part of the holes 9, 10. Advantageously, a tie rod 14 that may be a threaded rod, a screw bolt or the like is used therefor. This tie rod 14 fills the space between the projections 11, 12 and the upper part of the holes 9 and 10. In this way it is prevented that the web plate is detached unintentionally from the supporting sheet members. The tie rod 14 is secured against longitudinal displacement by cotter pins or the like. Advantageously, nuts 15, 16 are screwed onto the threaded ends of the tie rod 14 so that the supporting sheet members, the web plate and the bearing bars 5, 6 can be firmly tightened together.

The supporting sheet members 3, 4 may be additionally connected with the bearing bars 5, 6, e.g. by means of a pin, a tensioning sleeve 17 or the like.

The web plate 8 may be provided with mounting elements for receiving a load, e.g. a pipe conduit. Preferably, the web plate 8 has a hole 19 formed therein for passing a lug, a bracket or the like therethrough in order to apply a mounting rod assembly for a pipe conduit or the like.

The height of the web plate as a plate member depends on the load to be received. The individual parts of the supporting clamp are easy to be assembled and disassembled. The supporting sheet members and the bearings may be used with beams of optional size, thereby reducing the necessity of keeping different clamp sizes in store. The assembly of the plate members is simple and safe.

I claim:

1. A supporting clamp comprising a generally uni-planar plate member adapted to be disposed with a longitudinal axis thereof generally transverse to a longitudinal axis of a component to which the supporting clamp is adapted to be clamped, a projection at each of opposite end portions of said generally uni-planar plate member, a pair of sheet members each defined by a generally uni-planar portion and an integral bend, an opening in each sheet member generally uni-planar portion, said generally uni-planar plate member being disposed in generally normal relationship to said sheet member generally uni-planar portions, each projection being received in an associated opening, retaining means for retaining said projections in said openings, bearing means located generally in each of said bend for bearing against a surface of a component to which the supporting clamp is adapted to be clamped.

2. The supporting clamp as defined in claim 1 wherein said retaining means are defined by each projection being of a hook-like configuration in hooked engagement through said associated opening with the associated sheet member uni-planar portion.

3. The supporting clamp as defined in claim 1 wherein said retaining means is defined by bar means received in each of said openings for preventing relative displacement of said projections and openings in at least one direction.

4. The supporting clamp as defined in claim 3 wherein said bearing means are generally semi-circular in cross-section.

5. The supporting clamp as defined in claim 1 wherein said retaining means is defined by bar means received in each of said openings for preventing relative displacement of said projections and openings in at least a vertical direction.

6. The supporting clamp as defined in claim 1 wherein said openings are elongated.

7. The supporting clamp as defined in claim 1 wherein said openings are vertically elongated.

8. The supporting clamp as defined in claim 1 wherein said bearing means are generally semi-circular in cross-section.

9. The supporting clamp as defined in claim 1 wherein said bearing means is a generally semi-circular cross-sectional bearing bar associated with each bend.

10. The supporting clamp as defined in claim 1 wherein said projections are each defined by a slot opening in a direction generally transverse to said longitudinal axis thereby imparting a hook-like configuration to each projection.

11. The supporting clamp as defined in claim 1 wherein said projections are each defined by a slot opening in a direction generally transverse to said longitudinal axis thereby imparting a hook-like configuration to each projection, and each slot is of a size corresponding substantially to the thickness of its associated sheet member generally uni-planar portion.

12. The supporting clamp as defined in claim 1 wherein said bearing means are generally semi-circular in cross-section, and means for securing said bearing means to said bends.

13. The supporting clamp as defined in claim 1 wherein said bearing means is a generally semi-circular cross-sectional bearing bar associated with each bend, and means for securing each bearing bar in its associated bend.

14. The supporting clamp as defined in claim 1 wherein said retaining means is defined by bar means received in each of said openings for preventing relative displacement of said projections and openings in at least one direction, and means for securing said bar means in position preventing removal thereof from said openings.

15. The supporting clamp as defined in claim 1 wherein said retaining means is defined by bar means received in each of said openings for preventing relative displacement of said projections and openings in at least one direction, means for securing said bar means in position preventing removal thereof from said openings, said bar means is a tie bar spanning said openings, each tie bar having a threaded end projecting beyond its associated opening, and a nut threaded to each tie bar threaded end.

* * * * *